Patented May 29, 1951

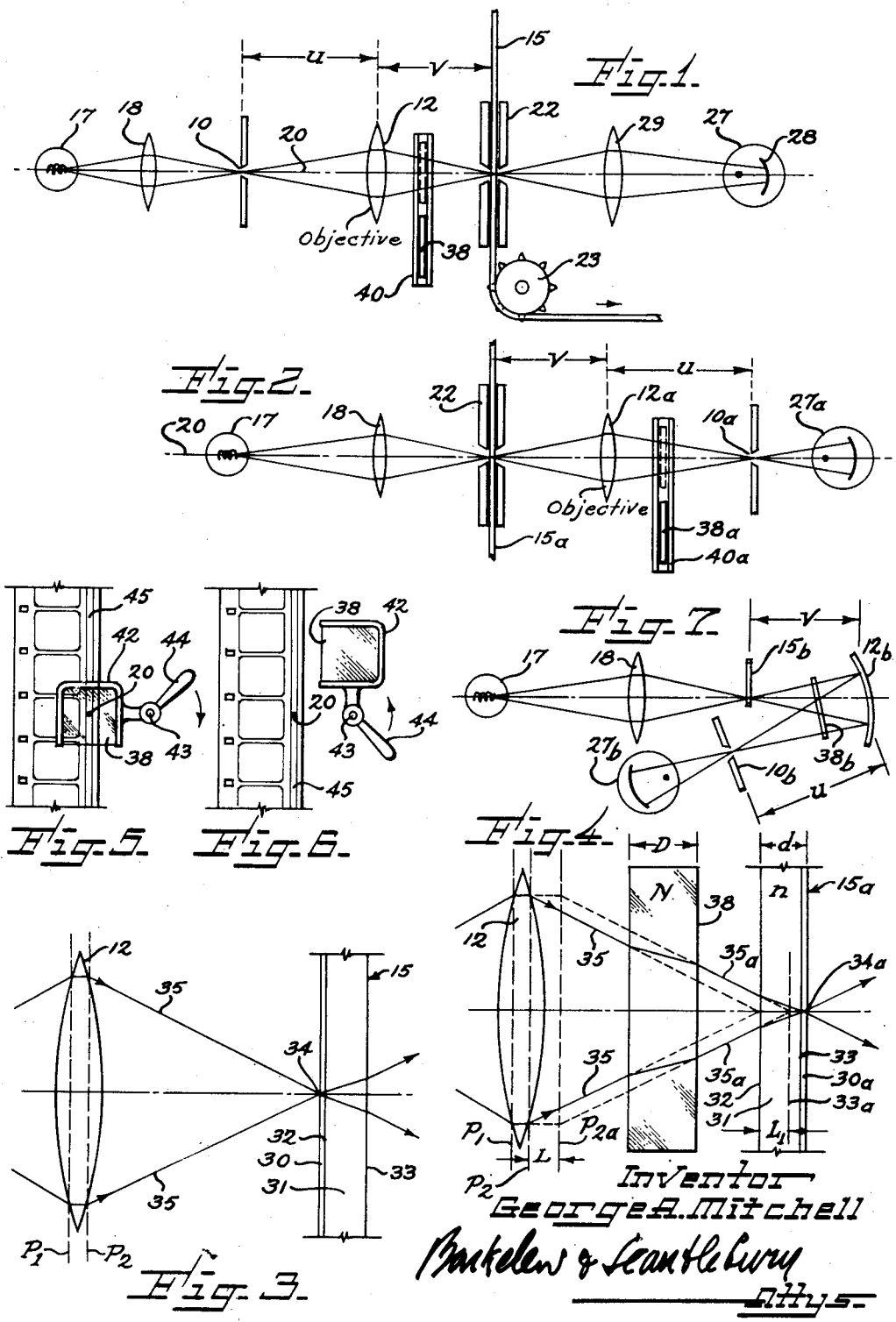

2,554,679

UNITED STATES PATENT OFFICE 2,554,679

FOCUS ADJUSTMENT FOR MOTION-PICTURE SOUND PICKUPS

George A. Mitchell, Pasadena, Calif., assignor to Mitchell Camera Corporation, Glendale, Calif., a corporation of Delaware Application January 30, 1948, Serial No. 5,295

1 Claim. (Cl. 88—1)

This invention is concerned generally with the reproduction of an image which is carried on a transparent film, and relates more particularly to the problem of focusing an optical system upon a photographic image carried by a motion picture film when that image may be carried on either face of the film base. While the invention can be used in reproducing sound motion pictures either for focusing the objective lens by which the picture image is projected onto the screen, or for focusing the optical system of the sound reproduction mechanism, or both, the advantages of the invention are particularly marked in connection with the sound pickup, and the invention will be described primarily with reference to that use.

Especially in the case of positive 16 mm. sound films, the side of the film base on which the photographic emulsion is carried depends upon such factors as the method by which the picture image on the film was produced. If the picture image was printed by contact from a normal negative, the film must be projected with the emulsion face away from the projection lens. Film produced by direct reversal of the original exposure, and film printed from a negative by projection (as in reducing 35 mm. film to 16 mm. size) must ordinarily be projected with the emulsion face toward the projection lens. A single reel of film often includes sections of different origin, so that the emulsion layer in effect shifts from one side of the film base to the other during projection.

The objective lens of the sound pickup system is not necessarily on the same side of the film as the picture projection lens, but in a given projection machine it is necessarily located on one side or the other of the film. Since the sound record and picture record are in practice necessarily on the same face of the film, the sound pickup as well as the picture projection system must be capable of being focused alternatively on either film face, and should be rapidly and conveniently shiftable as to focus from one face to the other. In some projection machines mechanical means are provided for shifting the entire objective lens of the sound system between the two definite lens positions which bring into focus the two faces of the film.

An important object of the present invention is to provide relatively simple and economical means for quickly shifting the focal plane of the sound pickup system from one film face to the other. Among the advantages of the invention is that the shift of focus does not require any change in the relative positions of the principal elements of the optical system, so that the ordinary simple and reliable mountings of those elements can be retained. The mechanical mechanism by which the shift of focus is accomplished is simple, requires no great accuracy in manufacture, and cannot get out of adjustment.

The focus shifting means of the invention makes use of the fact that the effective optical path length of a light ray depends upon the refractive index of the medium traversed. For this reason the focal plane of an objective lens can be altered by introducing into the light beam a layer of relatively refractive material, such for example as a plane parallel plate of glass. It is well known to insert such a plate of glass into an optical system to replace a similar plate which is removed from the system, or to compensate for a similar plate which is present in another part of the system. The present invention, however, is concerned with shifting an optical system between two alternative conditions of focus, each of which is appropriate to a definite type of film, and each of which is fully operative in conjunction with film of the appropriate type.

The required shift of focus is accomplished in accordance with the invention by moving a suitable glass plate, for example, into or out of the optical system. By proper choice of the portion of the optical system into which the plate is inserted, and by correspondingly suitable choice of the optical properties of the plate, one face of the film can be brought into focus when the plate is, say, removed from the optical system, the focus being then shifted to the other film face when the plate is inserted.

An important advantage of this method of shifting focus is the fact that the position of insertion of the plate is not at all critical, and that even the plane of the plate, if it is approximately normal to the optical axis of the objective lens, need not be determined with great accuracy. Thus the mechanical features of the focusing mechanism can be simple and economical, in contrast to previous systems of shifting the objective lens itself, in which both the amount of the shift and the orientation and mounting rigidity of the lens must be accurately maintained.

A full understanding of the invention and of further objects and advantages thereof will be had from the following description of certain illustrative embodiments of the invention as it may be employed in sound pickup systems of two typical sorts. The details of these embodiments and of the accompanying drawings, which form a part of the description, are presented as illustrations only, and are not intended to limit the broader scope of the invention. Of the drawings, Fig. 1 is a schematic diagram of one type of sound pickup optical system embodying the invention;

Fig. 2 is a schematic diagram illustrating another type of system embodying the invention in an alternative form;

Figs. 3 and 4 are schematic optical diagrams at enlarged scale, illustrating paths of typical light rays with the focusing plate respectively withdrawn and inserted, in a system such as Fig. 1;

Fig. 5 is a schematic illustration of a preferred mechanical embodiment of the invention, showing the focus-shifting plate in the light beam;

Fig. 6 is similar to Fig. 5, showing the focus-shifting plate out of the light beam; and Fig. 7 is a schematic diagram of an optical system similar to that of Fig. 2, but employing an objective mirror.

The invention is suitable for use with optical sound pick-up systems of many different types. The two illustrative optical systems shown in Figs. 1 and 2 are typical of those optical systems in which the sound record is imaged at a beam-defining aperture or diaphragm by an objective lens. It is immaterial for the present invention whether in fact light from an aperture 10 traverses the objective lens 12 and forms an image of the aperture at the film 15, as in Fig. 1; or whether light from the film 15a traverses the objective 12a and forms an image of the sound record at aperture 10a, as in Fig. 2. In either instance, the sound record and the aperture lie in conjugate focal planes of objective lens 12 (12a), and the aperture performs the function of limiting the light transmitted by the system to that portion of the beam which traverses a narrowly defined portion of the sound record. Correct definition of that narrow portion requires accurate focus of the objective upon the emulsion layer in which the sound track is formed.

For clarity of description, a common terminology will be applied to systems of both types (Figs. 1 and 2), the defining slit being considered to be imaged at the film regardless of the actual direction of the propagation of the light beam. Thus the object space and the object distance $u$ of lens 12 (12a) are the space and distance between aperture 10 (10a) and the corresponding principal plane of the lens, while the space and distance between the other principal plane of the lens and the film 15 (15a) will be termed the image space and the image distance $v$ respectively.

In Figs. 1 and 2 the light source is indicated at 17 with a condensing lens at 18 to concentrate a beam of light along the optical axis 20 of the system and to illuminate respectively slit 10 and film 15a.

The film position is defined longitudinally of optical axis 20 by film guides of any suitable type, indicated schematically at 22. Means adapted for moving the film at a uniform speed across the optical axis are shown schematically at 23 in the form of a continuously movable film engaging sprocket. The film moving and film guiding means may be of any suitable conventional type, and are not in themselves a part of the present invention. The light transmitted by the limited illuminated portion of film 15 in Fig. 1, or by the defining slit 10a in Fig. 2, is received by suitable radiation responsive means, such as phototube 27 or 27a.

A condensing lens 29 may be used, as shown in Fig. 1 at 29, in advance of the phototube to concentrate the light beam upon its cathode 28, or the light beam may fall directly upon the tube cathode as shown in Fig. 2. Other modifications of the optical system are well known in the art, the present detailed embodiments being intended as broadly illustrative of the types of system in which the invention can be embodied. In particular, objective lens 12, 12a may be representative of any image forming device, including a multi-element, photographic type lens, microscope objective, concave mirror, and the like. The optical system may be "folded" by the use of reflective elements such as mirrors or prisms.

Fig. 3 illustrates schematically typical ray paths 35 in the image space of Fig. 1, showing the convergence of the beam after traversing lens 12 to form an image of aperture 10 at film 15. In Fig. 3 the photographic emulsion layer 30, which contains the sound record, is carried on that face 32 of film base 31 which faces objective lens 12 (the nearer face); and the lens is so adjusted with respect to film 15 as to bring the light beam from slit 10 of Fig. 1 to a focus 34 at that film face. The focus 34 is an image of defining aperture 10 (Fig. 1). Thus the sound record and the defining aperture 10 are normally in conjugate focal planes of lens 12.

Now, if film is to be projected in which the emulsion layer 30a is carried on the opposite or farther face 33 of film base 31 (Fig. 4), it is evident from Fig. 3 that, in the absence of some compensating modification, the light beam diverges as it passes through film base 31, and does not form a sharp image at the farther face 33 of the film. This situation is remedied, according to one embodiment of the present invention, by inserting into the light beam between lens 12 and film 15 a plane parallel plate 38 of suitable transparent material. This has the result of moving the aperture image 34 away from the lens. By proper choice of the thickness and refractive index of plate 38 with reference to the thickness and refractive index of film base 31, the image can be brought accurately to the farther face of the film, as indicated at 34a in Fig. 4.

Insertion of plate 38 may be considered to have shifted the principal plane P₂ in the image space of the lens to the right, as seen in Figs. 3 and 4, to the position P₂ₐ. If D is the thickness of plate 38 and N is its refractive index, the distance L between the actual principal plane P₂ of the lens and its effective principal plane P₂ₐ in the presence of plate 38 is $$L = D\frac{N-1}{N} \qquad (1)$$

This must be made equal to L₁, the distance from the nearer face 32 of film base 31 to the apparent position 33a of its farther face 33 as seen from lens 12. If $d$ is the actual thickness of film base 31 and $n$ is its refractive index, the apparent thickness L₁ is $$L_1 = d/n \qquad (2)$$

Setting L equal to L₁ gives the condition which must be satisfied by D and N to give the required shift of focus from the nearer to the farther face of the film:

$$D\frac{N-1}{N} = \frac{d}{n} \quad (3)$$

It is particularly noteworthy that neither the focal length of lens 12 nor the distance of refractive plate 38 from lens 12 or from film 15a appears in Equation 3. Accordingly, if a plate 38 is suitable for use with film of a given thickness and refractive index, it can be used indiscriminately (in the modification just described) with any objective lens, and the exact position between lens and film at which it is inserted into the optical system can be chosen arbitrarily.

Ordinarily the plane of plate 38 is preferably normal to the optical axis, as in Fig. 4, since the resulting shift of image 34a relative to image 34 is then parallel to that axis. However, under certain conditions a small displacement of the image away from the axis may not be objectionable, and the plate can then be placed at an angle to the optical axis which differs slightly from 90 degrees without appreciably affecting the focus. The effective thickness $D_1$ of a plate which lies with its normal at an angle $B$ with the optical axis is given approximately in terms of its actual thickness $D$ by the relation $$D_1 = \frac{D}{\cos\frac{B}{N}} \quad (4)$$

and $\cos(B/N)$ is substantially equal to unity for values of $B$ close to zero. Hence, under such conditions, neither the position nor the orientation of the plate needs to be determined with high accuracy.

Various means can be provided for movably mounting plate 38 for motion into or out of the light beam. For example, the plate may be mounted to slide in ways or tracks as indicated at 40 in Fig. 1 and at 40a in Fig. 2. A preferred manner of mounting plate 38 is illustrated in Figs. 5 and 6. The plate is mounted in a frame 42 which is pivoted at 43 for rotational oscillation about an axis parallel to the optical axis 20. Handle 44 facilitates manual rotation of the frame and plate into the light beam, as shown in Fig. 3, or out of the beam, as shown in Fig. 4, as may be required by the type of film being projected. One side of frame 42 is preferably cut away, as illustrated, so that as plate 38 enters the light beam no appreciable shadow is formed which might disturb the pickup from the sound track, indicated at 45. Since plate 38 is ordinarily at some distance from the focus of the light beam (see, for example, Fig. 4), the slight shadow cast by the edge of the plate as it enters the beam does not cause any appreciable change in the total energy of the beam, and therefore produces no noticeable disturbance of the sound output of the system.

In an optical system of the type illustrated in Fig. 2, as in that of Fig. 1, that plane in the image space of lens 12a which is conjugate to the plane through aperture 10a can be shifted from the nearer to the farther face of film 15a by insertion of a suitable transparent plate into the light beam between the lens and film. The effect upon the light rays is then fully analogous to that already described in connection with Fig. 1, except that the direction of propagation of the light is reversed.

An alternative position in which the transparent plate can be inserted in both types of optical systems (Figs. 1 and 2) is between the lens and the beam defining aperture. That alternative modification is illustrated in Fig. 2, where plate 38a is schematically shown mounted in ways 40a for motion into and out of the light beam between lens 12a and aperture 10a. For the reasons explained above, the exact position of plate 38a along the axis between lens and aperture is arbitrary. With that arrangement, when plate 38 is inserted, the principal plane of the lens on the side toward the aperture (the object space) is shifted in the direction of the aperture through a distance L as given in Equation 1 above. This is equivalent to moving aperture 10a closer to the lens by a distance L, and has the result of shifting the corresponding focal point in the lens image space away from the lens by a distance M which depends upon L and upon the relative magnitudes of the image distance $v$ (from lens to film) and the object distance $u$ (from lens to aperture). If, as is generally true in practice, L is small in comparison to $u$, the relation between M and L is approximately given by $$M = L\left(\frac{v}{u}\right)^2 \quad (5)$$

The optical system is presumed to be so adjusted that in the absence of plate 38a the aperture 10a is imaged on the face of film 15a nearer to the lens. A shift of that image to the farther film face requires that the shift M equal $L_1$ as given in Equation 2 above. Hence with the present arrangement, using Equations 5 and 1, the thickness D and refractive index N of plate 34a must satisfy the relation $$M = L\left(\frac{v}{u}\right)^2 = D\frac{N-1}{N}\left(\frac{v}{u}\right)^2 = \frac{d}{n} \quad (6)$$

or $$D\frac{N-1}{N} = \frac{d}{n}\left(\frac{u}{v}\right)^2 \quad (6a)$$

The thickness D of the plate may then be generally expressed, for either position of the plate (Fig. 1 or Fig. 2) by $$D = \frac{d}{n}\frac{N}{N-1}\left(\frac{x}{v}\right)^2 \quad (6b)$$

where $x$ is that one of the two focal distances which lies on the plate side of the lens. If $x$ is $v$, then (6b) reduces immediately to (3). If $x$ is $u$, then (6b) is identic with (6a).

Under certain conditions the arrangement just described may offer advantages. For example, if lens 12 (12a) is similar to a microscope objective the lens-film distance $v$ is ordinarily far smaller than the lens-aperture distance $u$. There is then more space for transparent plate 38 (38a) in the object space of the lens than in the image space. Furthermore, the thickness of a plate suitable for use in the object space (Equation 6a) is then greater than the corresponding thickness for use in the image space (Equation 3), leading to a more rugged structure.

As an illustrative example of the use of Equation 3 when the image shifting plate is to be inserted between the lens and film, the following values may be assumed as typical of those encountered in practice:

Film thickness $d = 0.005''$

Film refractive index $n = 1.35$

Plate refractive index (glass) $N = 1.5$

Plate thickness $D = \frac{N}{N-1}\frac{d}{n} = 0.0111''$

If the objective lens of the system is a microscope objective of 0.5" focal length, with object and image distances (as here defined) of approximately, say 5" and 0.5" respectively, a suitable glass plate for insertion between lens and film has the thickness given above, 0.0111"; but for insertion between lens and aperture, the required glass thickness is $$D = 0.0111 \left(\frac{5}{0.5}\right)^2 = 1.11''$$

In an optical system such as that of Fig. 7, in which a concave mirror 12b performs the function of lens 12a in Fig. 2, forming at aperture 10b an image of the sound track carried on film 15b, a focus-shifting plate can be introduced at the position indicated at 38b, which is in effect both in the image space and in the object space of the lens (mirror). The total amount of the image shift resulting from such an arrangement is approximately the sum of the separate shifts caused by the presence of the plate in the image space $$\left(L = D\frac{N-1}{N}\right)$$

and in the object space $$\left(M = D\frac{N-1}{N}\left(\frac{v}{u}\right)^2\right)$$

so that the condition to be satisfied by D and N is $$D\frac{N-1}{N}\left(1 + \left(\frac{v}{u}\right)^2\right) = \frac{d}{n} \quad (7)$$

It will be understood that when the objective lens comprises a plurality of elements a focus-shifting plate can be introduced into the optical system between those elements. The plate then has the effect in general of altering the effective focal length of the lens as well as shifting the positions of the principal planes. For any given lens and plate position, appropriate constants for the required plate can be determined by application of known methods of optical computation. It is ordinarily preferable, however, to avoid disturbing the optical relationship of the elements of a lens system, by placing the focus shifting plate at some position in either the image or the object space.

In the preceding discussion the thickness $d$ of the film is to be understood as the distance between the two alternative planes in which the recorded image may lie in the light beam. The detailed calculation of that distance depends upon the nature of the image and its carrier. The image carrier may comprise a plurality of layers having respective refractive indices $n_1$, $n_2$, etc. The expression $d/n$ in the formulas given above is then to be replaced by $$\frac{d_1}{n_1} + \frac{d_2}{n_2} + \text{etc.}$$

In particular, if the image lies substantially in the outer face of a photographic emulsion layer, the effective thickness of the film is the total thickness of the film base plus the emulsion layer. The term "image carrier" is then to be understood as including not only the film base but also the emulsion layer.

In practice it is ordinarily not necessary to calculate the exact required thickness of plate 38, since that can be determined from tests with plates of various thicknesses. The formulas that have been discussed are then used to derive the approximate plate thickness, rather than its exact value.

For purposes of language simplicity in the following claims the term "lens" is used in the sense of including any optical image forming means or system, including for example an image forming reflector or a system made up of reflective and transmissive elements, as well as a transmissive lens or lens system.

I claim:

A system of the optical type for reproducing sound from a sound record which is carried alternatively on either one of two parallel faces of a film strip of predetermined optical thickness, said system comprising a light-beam limiting slit and associated light sensitive means, a positive lens, means for supporting the lens and slit in optical alignment in definitely fixed relative positions with the slit on and transverse of the optical axis of the lens and axially spaced from and on one side of the lens at a focal distance that is large compared to the focal length of the lens, means for confinedly supporting a film strip in a position on and transverse of the optical axis of the lens and slit at a definitely fixed position axially spaced from and on the other side of the lens at such a distance from the lens that the face of the film strip nearer to the lens is normally imaged at enlarged scale at the slit, the ratio of enlargement being large compared to unity, a plane parallel transparent plate, and mounting means carrying the plate for movement selectively into and out of a position where it extends substantially normally across the optical axis of the lens at a point between the lens and the slit and the associated light sensitive means, the optical thickness of the plate exceeding that of the film strip by a factor greater than the square of the said ratio of enlargement, and being such that upon positioning the same across the optical axis, the face of the film strip farther from the lens is imaged at the slit.

GEORGE A. MITCHELL.

REFERENCES CITED

The following references are of record in the file of this patent:

UNITED STATES PATENTS

| Number | Name | Date |
|---|---|---|
| 2,169,013 | Wittel | Aug. 8, 1939 |
| 2,184,831 | Campbell | Dec. 26, 1939 |
| 2,258,903 | Mitchell | Oct. 14, 1941 |

FOREIGN PATENTS

| Number | Country | Date |
|---|---|---|
| 468,704 | Great Britain | July 9, 1937 |

OTHER REFERENCES

Johnson: Text, Photographic Optics and Colour Photography, pages 200 to 203, published by Ward & Co., London, 1909.